United States Patent [19]

Van Paesschen et al.

[11] 4,089,997

[45] May 16, 1978

[54] PROCESS OF APPLYING ANTISTATIC COATING COMPOSITIONS TO POLYESTER FILMS

[75] Inventors: August Jean Van Paesschen, Antwerpen; Lucien Janbaptist Van Gossum, Kontich, both of Belgium

[73] Assignee: Agfa-Gevaert N.V., Mortsel, Belgium

[21] Appl. No.: 760,517

[22] Filed: Jan. 19, 1977

Related U.S. Application Data

[63] Continuation of Ser. No. 576,740, May 12, 1975, abandoned.

[30] Foreign Application Priority Data

May 14, 1974 United Kingdom .............. 21324/74

[51] Int. Cl.² .......................... G03C 1/78; G03C 1/96
[52] U.S. Cl. .................................. 427/171; 96/87 R; 96/87 A; 427/172; 427/173
[58] Field of Search ............. 96/87 A, 87 R; 427/171, 427/172, 173

[56] References Cited

U.S. PATENT DOCUMENTS

| 3,460,982 | 8/1969 | Appelbaum ........................ 96/87 R |
| 3,674,531 | 7/1972 | Shephard et al. .................... 96/87 R |
| 3,856,530 | 12/1974 | Van Paesschen et al. .......... 96/87 A |
| 3,911,172 | 10/1975 | Van Paesschen et al. .......... 96/87 A |

OTHER PUBLICATIONS

Union Carbide "Silanes" pp. 7–18, 8/1966.

*Primary Examiner*—Jack P. Brammer
*Attorney, Agent, or Firm*—William J. Daniel

[57] ABSTRACT

A process is provided for adhering an antistatic layer to a dimensionally stable polyester film support, e.g. a film of polyethylene terephthalate. To an unstretched or only monoaxially stretched polyester film is applied an antistatic layer from an aqueous coating composition. After drying of the antistatic layer it is stretched biaxially or in a direction perpendicular to the first stretching operation, together with the polyester film support and thereafter the polyester film is heat-setted. The aqueous coating composition comprises 30 to 80% by weight of an electroconductive product, 10 to 40% by weight of a stretch-improving agent and 10 to 40% by weight of an inert filler material.

The polyester film support may be provided on its opposite side with a subbing layer and one or more light-sensitive gelatin silver halide emulsion layers.

9 Claims, No Drawings

PROCESS OF APPLYING ANTISTATIC COATING COMPOSITIONS TO POLYESTER FILMS

This is a continuation, of Ser. No. 576,740, filed May 12, 1975, now abandoned.

This invention relates to antistatic coating compositions and to photographic films and materials comprising them.

It is known that in photographic materials the usual synthetic film supports have the property of being charged electrostatically, so that the charged films strongly attract the surrounding dust and thereby become soiled at their surface. Moreover, when such film supports are provided with a silver halide emulsion layer, discharge images may become visible in the light-sensitive layer upon development. Such an electrostatic charging results from the friction of the film support or light-sensitive photographic material during winding or unwinding in the coating, cutting or packing machines and by running the photographic material through the camera and the projector.

Although it is known that in practice the appearance of electrostatic charges on synthetic resin supports can be avoided by the application thereto of an electroconductive layer, it is also known that in the case of a polyester film support it is very difficult to establish and maintain a satisfactory bond between the surface of the polyester film support and the antistatic layer applied thereto. In most cases more than one layer is needed, e.g. first a special adhesive layer followed by the proper antistatic layer, whereto sometimes a protective layer is applied.

In order to give a sufficient dimensional stability to the polyester film support it is necessary to orient the film biaxially and to heat-set it at a relatively high temperature. This biaxial orienting can be performed by subjecting the film simultaneously to a longitudinal and a transversal stretching, usually, however, by stretching the film first in one direction and afterwards in a direction perpendicular to the first. This stretching of the film up to 3 to 5 times the original dimensions is performed at a temperature comprised between the glass transition temperature and the softening temperature of the polyester. In the case of films of polyethylene terephthalate the stretching is performed usually between 80° and 90° C.

After the biaxial stretching the film is conducted through a heat-setting zone wherein the film is heated until a temperature between 180° and 220° C is reached, the film being kept under tension in both directions. In this way a dimensionally stable fully clear polyester film is obtained.

The present invention provides a process for adhering an antistatic layer to a dimensionally stable polyester film support, which process comprises applying to an unstretched or only monoaxially stretched polyester film support an antistatic layer from an aqueous coating composition, drying said antistatic layer and stretching it biaxially or in a direction perpendicular to the first stretching operation together with the polyester film support and heat-setting the polyester film, said aqueous coating composition comprising 30 to 80% by weight of an electro-conductive product, 10 to 40% by weight of a stretch-improving agent and 10 to 40 % by weight of an inert filter material.

The coating composition for the antistatic layer comprises 30 to 80 % by weight of an electroconductive product, which may be a polymeric material chosen from a very large number of known polymers or copolymers such as :
polyethylene oxide
alkali metal salts of copolymers of acrylic, methacrylic or maleic acids,
the free acids and the amine or ammonium salts of polymeric sulphonic acids such as :
  partially or completely sulphonated polystyrene
  sulphoalkyl esters of polymers or copolymers of acrylic, methacrylic or maleic acids,
  polyvinylsulphonic acid,
  polyvinylsulphobutyral,
  polyvinylsulphobenzal,
polyethylenimine hydrochloride,
quaternized polyethylenimine,
quaternized polymers of vinylpyridine and derivatives,
polymers and copolymers of :
  N-vinyl-4-methyl-2-oxazolidinone,
  N-vinyltrimethylammonium chloride,
  N-(3-acrylamido-propyl)-trimethylammonium chloride,
  acryloyloxyethyldimethylsulphonium chloride
  N-(methacryloyloxyethyl)-trimethylammonium chloride,
  N-(methacryloyloxyethyl)-trimethylammonium methyl sulphate,
  N-(2-hydroxy-3-methacryloyloxypropyl)-trimethylammonium chloride,
  N-methyl-4-vinylpyridinium chloride,
  vinylbenzyltrimethylammonium chloride,
polymers obtained when polyepichlorohydrin is used as quaternizing agent for a tertiary amine, a tertiary phosphine or a secondary sulphide,
polymers obtained by the reaction of polyepichlorohydrin with a secondary amine, e.g. morpholine or with a mercaptan such as 2-mercapto-ethanol, followed by the quaternization with an alkylating agent such as an ester of an alcohol and a strong acid such as the methyl or ethyl ester of sulphuric acid, phosphoric acid, hydrochloric acid, hydrobromic acid or hydroiodic acid, e.g. dimethyl sulphate or bromoethanol.

In these polymers or copolymers the recurring units carrying anionic or cationic groups are responsible for the electroconductivity of the antistatic layer. In order to obtain a sufficient electroconductivity the polymers and copolymers have to be formed of at least 50 % of recurring units comprising these anionic or cationic groups.

In principle it is possible to replace the electroconductive polymer in the coating composition for the antistatic layer partially by a compatible non-electroconductive polymeric or monomeric ingredient. Such an addition can be made to improve certain physical characteristics of the coating solution. For instance polymeric or other thickening agents, spreading agents etc.

Instead of the polymeric electroconductive products as exemplified above also low molecular weight antistatic compounds can be used such as cationic, anionic or amphoteric compounds that are dispersible or soluble in aqueous solutions. In the first place may be used the acid forms and the alkali metal salts of benzenesulphonic acids, e.g. the sodium salt of p-nitro-benzene sulphonic acid, p-toluene sulphonic acid, the sodium salt of 4-chloro-m-toluene sulphonic acid, the sodium salt of p-bromo-benzene-sulphonic acid, 2,5-dichloro-benzene-sulphonic acid, the sodium salt of p-hydroxybenzene sulphonic acid, and sulphosalicylic acid. Salts of polybasic carboxylic acids, e.g. of mellitic acid, citric acid, salicylic acid, succinic acid, oxalic acid, and maleic acid can be used also. Moreover, alkyl phosphates having alkyl chains of 1 to 5 carbon atoms are also suitable, e.g. ethyl dihydrogen phosphate, butyl dihydrogen phosphate and dibutyl hydrogen phosphate. Very interesting are also quaternary ammonium compounds such as dimethyl stearamido-propyl-2-hydroxyethyl ammonium nitrate and the long alkyl chain-substituted imidazolium derivatives as described in the published German patent application No. 2,128,803 filed June 9, 1971 by Fuji Shashin Film Kabushiki Kaisha.

If the low molecular weight antistatic compound is film-forming, it can be used as such in the antistatic layer. In the other case, it is mixed with a film-forming inert binder.

A crystalline film of polyethylene terephthalate is obtained by extruding polyethylene terephthalate in the melt and to quench it immediately on a cooling cylinder to form an amorphous film. This amorphous film is then stretched longitudinally and transversally, i.e. first longitudinally and then transversally, or first transversally and then longitudinally, or in but a single operation, i.e. biaxially, the stretching being performed at 80° to 90° C to form a crystalline film having its dimensions increased by 3 to 5 times. A layer applied before a stretching operation must meet two special requirements:

1. in unstretched condition and consequently being 3 to 5 times thicker than after having been stretched, the layer should possess sufficient adhesion to the polyester film and sufficient hardness so that it is not easily damaged during the stretching operation.
2. The layer should have a softening temperature which is lower than the stretching temperature used, which is generally from 80° to 90° so that it can be stretched to a homogeneous layer without the appearance of microscopic cracks.

In the case of polymeric antistatic agents this stretchability often presents problems because the glass transition temperature (Tg) of such polymers usually exceeds 100° C. Thus, polyacrylic acid with a glass transition temperature of 106° C (see O. Griffin Lewis : Physical constants of linear homopolymers, Springer Verlag 1968) in anhydrous form is not stretchable at 80° to 90° C.

Since the glass transition temperature of ionic (co) polymers cannot be found in the scientific literature, a softening temperature, which can be determined on a Kofflerhot bench, provides a suitable criterion. Examples of such values are as follows:

|  | Softening temp. |
| --- | --- |
| co(ethylene-maleic acid) | 130° C |
| co(styrene-maleic acid sodium salt) | 200° C |
| polystyrene sulphonic acid | 220° C |
| polyvinylbenzyl trimethylammonium chloride | >220° C |

An addition of stretch-improving agents according to the invention has the effect of lowering the softening temperature of the layer to below 80°-90° C, which is the usual stretching temperature.

Most suitable are aliphatic polyhydroxy compounds, which lower the softening temperature of the layer, e.g. glycerol, tri(β-hydroxyethyl)glycerol, 1,1,1-tri(hydroxymethyl)propane, 2-nitro-2-ethyl-1,3-propanediol, 1,3-dichloro-2-propanol, 1,2,4-butanetriol, 3-hydroxymethyl-2,4-dihydroxypentane, 1,2,6-hexanetriol, 2-hydroxymethyl-4-hydroxy-amyl alcohol, glycerol-aldehyde and mannitol.

Equally suitable compounds are caprolactam and N,N'-dimethylurea.

Other suitable stretch-improving agents are aliphatic or sulphonic acids, even though they do not lower the softening temperature of the layer, e.g. malonic acid, glutaric acid, adipic acid, azelaic acid, sebacic acid, mono- and dichloroacetic acid, 1,2,3-propene tricarboxylic acid, acrylic acid, methacrylic acid, maleic acid, fumaric acid, itaconic acid, and 2-sulpho-ethyl methacrylate; further aromatic acids such as phthalic acid, o-sulphobenzoic acid, o-nitrobenzoic acid, o-aminobenzoic acid, p-hydroxybenzoic acid, and salicylic acid.

Finally 10 to 40 % by weight of an inert filler material is added to the coating composition of the antistatic layer as well. The purpose of the addition of the filler material is to improve the mechanical properties of the layer, mainly with respect to the scratchability, the surface-vulnerability, wet finger prints, etc. The best results are obtained by the addition to the layer of heterodisperse particles having a softening temperature above 50° C. In this respect the primary and secondary polymeric dispersions of i.a. polystyrene, polyalkyl methacrylate, polyethylene and polypropylene can be mentioned. Very good results can also be obtained with inorganic pigments such as amorphous or crystalline silicon dioxide, titanium dioxide and calcium carbonate, although some of these pigments give the layer a somewhat mat aspect as a result of their high refractive index. Amorphous silicon dioxide, i.a. obtained by hydrolysis in situ of silane compounds, however, gives a clear layer with optimal mechanical and antistatical characteristics.

Appropriate silane compounds correspond to the following general formula:

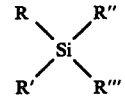

wherein :
each of R and R' represents hydrogen, alkyl, chloroalkyl, aminoalkyl, alkoxy, hydroxyalkoxy, aminoalkoxy, epoxyalkoxy, alkoxyalkoxy, acetyloxy, vinyl or phenyl, the different alkyl and alkoxy groups containing 1 to 4 carbon atoms, and
each of R" and R"' represents cyanoalkyl, aminoalkyl, aminoalkoxyalkyl, epoxyalkoxyalkyl, alkoxycarbonylalkyl, (meth)acryloyloxyalkyl, (meth)acrylamidoalkyl, chloroacetamidoalkyl, N(aminoalkyl)-aminoalkyl, bis(N-hydroxyalkyl)-aminoalkyl, alkoxy, hydroxyalkoxy, aminoalkoxy, epoxyalkoxy, alkoxyalkoxy, phenoxy, acetyloxy, and 3-[7-oxabicyclo-(4,1,0)-heptyl]-alkyl, the different alkyl or alkoxy groups containing 1 to 4 carbon atoms.

Suitable silane compounds according to the invention are e.g. :
dimethyl-diphenoxy-silane
dimethyl-bis(2,3-epoxypropoxy)-silane
diphenoxy-diphenyl-silane
diethoxy-dimethyl-silane
diethoxy-methyl-(4-aminobutyl)-silane
diethoxy-diphenyl-silane 2-(ethoxycarbonyl)-propyl-diethoxy-silane
dimethoxy-methyl-[N(2-aminoethyl)-3-amino-2-methyl-propyl]-silane
dimethoxy-bis[N-(2-hydroxyethyl)]-3-aminopropyl-silane
3-chloropropyl-trimethoxy-silane
trimethoxy-3-(methacryloyloxy)propyl-silane
trimethoxy-[N-(2-aminoethyl)-3-aminopropyl]-silane
trimethoxy-[3-(2,3-epoxypropoxy)-propyl]-silane
bis(2-aminoethoxy)-methyl-[3-(2-aminoethoxy)-propyl]-silane
trimethoxy-2-{3-[7-oxabicyclo-(4,1,0-heptyl)]-ethyl }-silane
triethoxy-silane
methyl-triethoxy-silane
triethoxy-vinyl-silane
phenyl-triethoxy-silane
2-cyanoethyl-triethoxy-silane
3-aminopropyl-triethoxy-silane
(2-ethoxycarbonyl-ethyl)-triethoxy-silane
(3-chloroacetamido-propyl)-triethoxy-silane
(3-acrylamidopropyl)-triethoxy-silane
tripropoxysilane
tributoxysilane
tris(2-methoxyethoxy)-vinyl-silane
tris(2,3-epoxypropoxy)-ethyl-silane
tetraethoxysilane
tetrapropoxysilane
tetrabutoxysilane
tetrakis(2,3-dihydroxypropoxy)-silane
vinyl-triacetoxy-silane.

Aqueous solutions of polymeric compounds with a glass transition temperature above 50° C such as gelatin and polyvinyl alcohol can also be used as filler material.

In order to form the antistatic layer on the polyester film support the electroconductive product and the other ingredients are dissolved or dispersed in water or in mixtures of water and solvents such as in lower alcohols, which are not swelling agents for the amorphous polyethylene terephthalate and thus will not bring about crystallization of the polyester.

The antistatic coating composition is applied in such concentration and manner known in the art as to yield on the polyester film support after stretching an antistatic layer having a thickness of preferably between 0.1 and 1.0 μm.

To give the layer a sufficient electroconductivity and for the use thereof as an antistatic coating on a polyester film, the surface resistance should not exceed well defined limits, which themselves are influenced by the degree of relative humidity. For example, the surface resistance at 30 % relative humidity should be lower than $1.10^{11}$ ohm/sq., whereas at 60 % relative humidity it should be lower than $1.10^{10}$ ohm/sq.

Thus the electroconductivity of the antistatic layer is determined by measuring its surface resistance. Therefore, after conditioning at a specific relative humidity of a material composed of a polyester film support, to which an antistatic coating according to the invention has been applied, the surface resistance of the material is measured by means of a cell, both poles of which have a width of 0.5 cm and are at a distance of 1 cm from each other.

In the examples various layers and their electroconductivity are described.

In addition to the electroconductive product, the stretch-improving agent and the filler material, the composition of the antistatic layer may include small amounts, e.g. between 10 and 20 % by weight with respect to the dry weight of the whole coating composition, of a waxy material, such as unbranched saturated fatty acids, e.g. stearic acid and palmitic acid, esters derived from fatty acids and fatty alcohols, e.g. stearyl stearate and n-hexadecyl palmitate, pentaerythritol esters of fatty acids such as stearic acid, palmitic acid and lauric acid, sucrose, diesters of fatty acids such as sucrose distearate, N,N-alkylene-bis-fatty acid amides, e.g. N,N-ethylene-bis-oleylamide and montan wax derivatives, which are generally glycerol, glycol or polymerised ethylene glycol esters of acids from montan wax. These waxy materials are added to the coating composition of the antistatic layer to further improve its resistance to friction and scratching.

The layer according to this invention may be applied by spray, brush, roller, doctor blade, air brush, or wiping techniques.

The adhesion of the antistatic layer to the polyester film support is excellent. This adhesion can be tested by cross-wise scratching the antistatic layer by means of a sharp knife. Upon these scratches a pressure-sensitive adhesive tape is pressed and thereafter torn off at once. The adhesion is considered to be good if but very small pieces of the antistatic layer are torn off.

The advantage of the process according to the invention is manifest. If, as described hereinbefore, the coating composition for the antistatic layer is applied to the polyester film support before the transversal stretching of the film, the film then has a width 3 to 5 times less than after the stretching operation. Consequently a 3 to 5 times narrower coating machine suffices, which is a very interesting advantage from an economic viewpoint. The drying cabinets can also be made smaller 3 to 5 times.

The invention offers an other advantage. Indeed after the stretching a heat-setting of the polyester support at 180° to 220° C is necessary i.a. to complete the crystallization of the polymer and to secure the dimensional stability of the polyester film. This heating at 180° to 220° C gives rise to a superficial interdiffusion between the antistatic layer and the polyester support, thus resulting in an improved adhesion of the antistatic layer to the support without the need of the addition of adhesion-improving agents.

Another advantage of the antistatic layer according to the invention is the permanent antistatic effect obtained with this layer even after rinsing of the film with water or photographic baths. This is a consequence of the partial interdiffusion of the layer in the support during heat-setting. Moreover, the heat-setting sometimes causes partial thermic cross-linking when an electro-conductive polymer is used, which makes these antistatic agents less readily soluble.

According to the invention also a photographic film material is provided comprising a polyester support, at least one light-sensitive silver halide emulsion layer on one side of the polyester support, and on the other side of that support an antistatic layer comprising an electroconductive product, a stretch-improving agent and an inert filler material as hereinbefore defined.

Films having an antistatic layer according to the present invention may serve for the manufacture of photographic black-and-white as well as colour films.

According to the invention also the monolayer antistatic coating can be applied to both sides of a polyester film support. In this way a material is obtained that does not attract the surrounding dust, that has excellent optical properties and can be used as a mounting foil, a drafting foil, or as a support for copying processes.

The examples hereinafter are especially directed to the use of polyethylene terephthalate film as support for the antistatic layer and the other layers applied thereto. The antistatic layer can, however, be applied also to other polyester films, e.g. films of polyesters resulting from the polycondensation of glycol, or mixtures of glycols with terephthalic acid, or mixtures of terephthalic acid with minor amounts of other dicarboxylic acids such as isophthalic acid, diphenic acid, and sebacic acid.

The invention is illustrated by the following examples.

EXAMPLE 1

A substantially amorphous polyethylene terephthalate film having a thickness of approximatively 2.2 mm was formed by extrusion of molten polyethylene terephthalate at about 280° C on a quench drum and was chilled to about 75° C and then stretched in the longitudinal direction over a differential speed roll stretching device to 3.5 times its initial dimension at a temperature of 84° C.

An antistatic layer was applied to the thus stretched film at a ratio of 70 sq.m/liter from the following coating composition:

| | |
|---|---|
| polystyrene sulphonic acid as a 10% aqueous solution adjusted to pH 8.5 with ammonium hydroxide | 600 ml |
| glycerol | 30 ml |
| methylcellulose (low viscosity) as a 10% aqueous solution | 100 ml |
| ULTRAVON W (10% aqueous solution) | 5 ml |
| water to make 1000 ml. | |

ULTRAVON W is the trade name of CIBA A.G., Switzerland, for a dispersing agent consisting of the disodium salt of heptadecylbenzimidazole disulphonic acid.

The layer was dried in a hot airstream whereafter the film was stretched transversally to 3.5 times its original width at a temperature of about 87° C in a tenter frame. The final thickness of the film was about 0.180 mm.

The film was then conducted into an extension of the tenter frame, where it was heat-set while kept under tension at a temperature of 200° C for about 10 seconds. After heat-setting the coated film was cooled and wound up in the normal manner.

The antistatic layer adhered very well to the polyester support, which was proved according to the method of the pressure-sensitive adhesive tape described hereinbefore.

The surface resistance of the antistatic layer measured at a relative humidity of 30 % was $1.5 \times 10^8$ Ohms/sq.

EXAMPLE 2

The method described in Example 1 was repeated, with the difference, however, that the following coating composition was used :

| | |
|---|---|
| polystyrene sulphonic acid as a 10% aqueous solution adjusted to pH 8.5 with ammonium hydroxide | 900 ml |
| methylsulphonic acid adjusted to pH 8.5 with ammonium hydroxide | 15 ml |
| 30% aqueous polyethylene dispersion | 75 ml |
| ULTRAVON W (10% aqueous solution) | 5 ml |
| water until 1000 ml. | |

The antistatic layer adhered very well to the support and its surface resistance at 30 % of relative humidity was $5.10^7$ Ohms/sq.

EXAMPLE 3

The method described in Example 1 was repeated, with the difference, however, that the following coating composition was used :

| | |
|---|---|
| co(ethylene/maleic acid) sodium salt as 10% aqueous solution | 500 ml |
| glycerol | 50 ml |
| SILANE A-186 | 50 ml |
| saponine (a 12.5% solution in a mixture of water and ethanol (80:20) | 5 ml |
| water to make 1000 ml. | |

Silane A-186 is the trade-name of Union Carbide, U.S.A. for a silane compound of the formula :

$$\begin{array}{c} CH_2 \\ CH_2 \\ O \\ CH_2 \end{array} \begin{array}{c} CH_2 \\ \\ CH_2 \end{array} CH-CH_2-CH_2-\underset{\underset{OCH_3}{|}}{\overset{\overset{OCH_3}{|}}{Si}}-OCH_3$$

The antistatic layer adhered very well to the support and its surface resistance at a relative humidity of 30 % was $2.10^9$ Ohms/sq.

EXAMPLE 4

The method described in Example 1 was repeated, with the difference, however, that the following coating composition was used :

| | |
|---|---|
| co(styrene/maleic acid) sodium salt as a 20% aqueous solution | 500 ml |
| TRIOL H | 50 ml |
| 30% aqueous dispersion of colloidal silicon dioxide | 150 ml |
| 10% aqueous solution of ULTRAVON W | 5 ml |
| water to make 1000 ml. | |

TRIOL H is the trade-name of Rheinpreussen A.G., Germany, for hexanetriol of the formula :

$$H_2C-CHOH-CH_2-\underset{\underset{CH_2OH}{|}}{\overset{\overset{CH_2OH}{|}}{CH}}$$

The antistatic layer adhered very well to the support and its surface resistance at a relative humidity of 30 % was $2.10^9$ Ohms/sq.

EXAMPLE 5

The method described in Example 1 was repeated, with the difference, however, that the following coating composition was used :

polystyrene sulphonic acid as a 10% aqueous solution adjusted to pH 8.5 with

-continued

| | |
|---|---|
| ammonium hydroxide | 500 ml |
| diethylene glycol monoethyl ether | 15 ml |
| SILANE Y-4087 | 25 ml |
| 10% aqueous solution of ULTRAVON W | 5 ml |
| water to make 1000 ml. | |

SILANE Y 4087 is the trade-name of Union Carbide, U.S.A. for a silane compound of the formula:

$$H_2C\overset{O}{\underset{}{\diagup\!\!\diagdown}}CH-CH_2-O-(CH_2)_3-\underset{\underset{OCH_3}{|}}{\overset{\overset{OCH_3}{|}}{Si}}OCH_3$$

The antistatic layer adhered very well to the support and its surface resistance at a relative humidity of 30 % was $8.10^9$ Ohms/sq.

EXAMPLE 6

The method described in Example 1 was repeated, with the difference, however, that the following coating composition was used:

| | |
|---|---|
| 10% aqueous solution of CATANAC SN | 500 ml |
| 30% aqueous dispersion of polystyrene | 100 ml |
| maleic acid | 40 g |
| 10% aqueous solution of ULTRAVON W | 5 ml |
| water to make 1000 ml. | |

CATANAC SN is the trade-name of America Cyanamid for a 65 % paste in a mixture of water and isopropanol of stearamidopropyl dimethyl β-hydroxyethyl ammoniumnitrate.

The antistatic layer adhered very well to the support and its surface resistance at a relative humidity of 30 % was $7.5 \cdot 10^8$ Ohms/sq.

EXAMPLE 7

The method described in Example 1 was repeated, with the difference, however, that the following coating composition was used:

| | |
|---|---|
| 10% aqueous solution of CALGON CONDUCTIVE POLYMER 261 | 700 ml |
| glycerol | 20 ml |
| 10% aqueous solution of gelatin | 100 ml |
| 12.5% solution of saponine in a mixture of water and ethanol (80:20) | 10 ml |
| water to make 1000 ml. | |

CALGON CONDUCTIVE POLYMER 261 is the trade-name of Calgon Corporation, U.S.A., for an electroconductive polymer containing 39.1 % by weight of active conductive solids, and having recurring units of the following type:

$$\left[\begin{array}{c} H_3C\diagdown\underset{N}{\overset{+}{\phantom{N}}}\diagup CH_3 \\ H_2C\diagup \quad \diagdown CH_2 \\ | \quad\quad\quad | \\ -HC\diagdown \quad \diagup CH-CH_2- \\ \underset{H_2}{C} \end{array}\right] \cdot Cl^-$$

The antistatic layer adhered very well to the support and its surface resistance at a relative humidity of 30 % was $6.10^7$ Ohms/sq.

EXAMPLE 8

The method described in Example 1 was repeated, with the difference, however, that the following coating composition was used:

| | |
|---|---|
| 10% aqueous solution of CALGON CONDUCTIVE POLYMER 261 | 300 ml |
| 10% aqueous solution of adipic acid adjusted to pH 8.5 with ammonium hydroxide | 400 ml |
| 20% aqueous solution of polyvinyl alcohol | 150 ml |
| 10% aqueous solution of ULTRAVON W | 5 ml |
| water to make 1000 ml. | |

The antistatic layer adhered very well to the support and its surface resistance at a relative humidity of 30 % was $1.5 \cdot 10^8$ Ohms/sq.

EXAMPLE 9

A substantially amorphous polyethylene terephthalate film having a thickness of approximatively 1.2 mm was formed by extrusion of molten polyethylene terephthalate at a temperature of about 280° C on a quench drum and was chilled to a temperature of about 75° C and then stretched in the longitudinal direction over a differential speed roll stretching device to 3.5 times its initial dimension at a temperature of 84° C.

One side of this support was coated with an antistatic layer as described in example 4. The other side of the support was coated with a subbing layer of a co(vinyl chloride, vinylidene chloride, butyl acrylate, itaconic acid) (63/30/5/2) as described in the U.K. Patent Specification No. 1,234,755.

The layer was dried in a hot airstream, whereafter the film was stretched transversally in a tenter frame to 3.5 times its original width at a temperature of about 87° C. The final thickness of the film was about 0.1 mm.

The film was then conducted into an extension of the tenter frame, where it was heat-set while kept under tension at a temperature of 180° C for about 20 seconds.

The subbing layer comprising vinyl chloride copolymer is then coated with the following composition at a ratio of 30 sq.m per liter:

| | |
|---|---|
| gelatin | 8 g |
| colloidal silicon dioxide | 12 g |
| caprolactam | 4 g |
| hexanetriol | 2 g |
| glyoxal | 1 g |
| surface-active coating aids | 0.6 g |
| water | 600 ml |
| methanol | 400 ml. |

After drying, a light-sensitive gelatin silver halide emulsion of the positive fine grain type was coated thereon.

The antistatic properties of this photographic material were very good. Dust was not attracted by this film. It appeared that after storage in roll form, the emulsion, which had been in contact with this rear side, had not been influenced adversely.

We claim:

1. Process for adhering an antistatic layer to a dimensionally stable polyester film support, which process comprises applying directly to an unstretched or only monoaxially stretched polyester film support an antistatic layer from an aqueous coating composition, drying said antistatic layer and stretching the polyester support carrying the dried antistatic layer biaxially or in a direction perpendicular to the first stretching operation, and heat-setting the thus coated and stretched polyester film, said aqueous coating composition consisting essentially of 30 to 80% by weight of an electroconductive polymer, 10 to 40% by weight of a stretch-improving agent for said polymer selected from the group consisting of (a) an aliphatic polyhydroxy compound,
(b) caprolactam,
(c) N,N'-dimethyl urea, and
(d) an aliphatic or aromatic carboxylic or sulfonic acid and 10 to 40% by weight of a filler material selected from the group consisting of a non-electroconductive polymer of an α,β-ethylenically unsaturated monomer in dispersed particle form, an inorganic pigment, a silane compound hydrolyzable in situ to amorphous silicon dioxide, and gelatin, said electroconductive polymer having at least 50% of its recurring units carrying an electroconductive anionic or cationic group and imparting to said antistatic layer an electrical surface resistance lower than $1 \times 10^{10}$ ohm/sq area measured at 30% R.H.

2. A process according to claim 1, wherein the polyester film support is a film of polyethylene terephthalate.

3. A process according to claim 1, wherein the electroconductive product is polystyrene sulphonic acid.

4. A process according to claim 1, wherein said inert filler material is a silane compound corresponding to the formula:

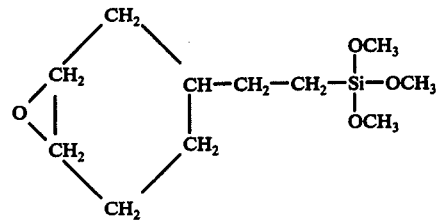

5. A process according to claim 1, wherein the electroconductive product is the sodium salt of a copolymer of ethylene and maleic acid.

6. A process according to claim 1, wherein the electroconductive product is the sodium salt of a copolymer of styrene and maleic acid.

7. A process according to claim 1, wherein the stretch-improving agent is caprolactam.

8. A process according to claim 1, wherein the antistatic layer is applied to a longitudinally stretched polyester film support.

9. The process of claim 1 wherein said filler material is a silane compound corresponding to the general formula:

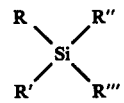

wherein:
each of R and R' represents hydrogen, alkyl, chloroalkyl, aminoalkyl, alkoxy, hydroxyalkoxy, aminoalkoxy, epoxyalkoxy, alkoxyalkoxy, acetyloxy, vinyl or phenyl, the different alkyl and alkoxy groups containing 1 to 4 carbon atoms, and
each of R" and R'" represents cyanoalkyl, aminoalkyl, aminoalkoxyalkyl, epoxyalkoxyalkyl, alkoxycarbonylalkyl, (meth)acryloyloxyalkyl, (meth)acrylaminodoalkyl, chloroacetamidoalkyl, N(aminoalkyl)-aminoalkyl, bis(N-hydroxyalkyl)-aminoalkyl, alkoxy, hydroxyalkoxy, aminoalkoxy, epoxyalkoxy, alkoxyalkoxy, phenoxy, acetyloxy, and 3-[7-oxabicyclo-(4,1,0)-heptyl]-alkyl, the different alkyl or alkoxy groups containing 1 to 4 carbon atoms.

* * * * *